(12) United States Patent
Li (10) Patent No.: US 8,811,816 B2
(45) Date of Patent: Aug. 19, 2014

(54) METHOD AND SYSTEM FOR DETECTING OPTICAL FIBRE CONNECTION

(75) Inventor: Long Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 168 days.

(21) Appl. No.: 13/639,251

(22) PCT Filed: Mar. 17, 2011

(86) PCT No.: PCT/CN2011/071925
§ 371 (c)(1),
(2), (4) Date: Oct. 4, 2012

(87) PCT Pub. No.: WO2011/124107
PCT Pub. Date: Oct. 13, 2011

(65) Prior Publication Data
US 2013/0028594 A1 Jan. 31, 2013

(30) Foreign Application Priority Data

Apr. 8, 2010 (CN) .......................... 2010 1 0147962

(51) Int. Cl.
*H04B 17/00* (2006.01)
*H04B 10/07* (2013.01)

(52) U.S. Cl.
CPC ..................................... *H04B 10/07* (2013.01)
USPC ..................................... 398/25; 398/9; 398/28

(58) Field of Classification Search
CPC .. H04B 10/07; H04B 10/079; H04B 10/0793; H04B 10/801; H04Q 2011/0079; H04Q 2011/0083; H04Q 2011/0071; H04J 14/0227; H04J 2203/0051
USPC ................................ 398/9, 13, 17, 20, 28, 33
See application file for complete search history.

(56) References Cited

U.S. PATENT DOCUMENTS

| 8,391,707 | B2 * | 3/2013 | Wellbrock et al. ................. 398/5 |
| 2009/0129773 | A1 * | 5/2009 | Oron ............................... 398/10 |
| 2011/0170857 | A1 * | 7/2011 | Fee et al. ......................... 398/19 |

FOREIGN PATENT DOCUMENTS

| CN | 1728609 | A | 2/2006 |
| CN | 1964283 | A | 5/2007 |
| CN | 101621722 | A | 1/2010 |
| CN | 101834663 | A | 9/2010 |

OTHER PUBLICATIONS

P.R. China, State Intellectual Property Office, International Search Report for International Application No. PCT/CN2011/071925, mailed Jun. 30, 2011.

* cited by examiner

*Primary Examiner* — Dalzid Singh
(74) *Attorney, Agent, or Firm* — Bright IP Law Offices (57) ABSTRACT

The disclosure claims a method and system for detecting optical fiber connection. The method comprises: a single board judges whether the received connection information of downstream single board, connection information of upstream single board and connection information of the single board is the reported current optical fiber connection relationship information; if no, reporting the received connection information to network management system; the network management system generates the optical fiber matching connection relationship information of all single boards currently installed according to the actual installation condition of the single board, and determines whether the reported current optical fiber connection relationship information is the correct optical fiber connection relationship according to the optical fiber matching connection relationship information; if yes, displaying the current optical fiber connection relationship information; otherwise, prompting that currently it is the wrong optical fiber connection relationship, and displaying the optimal optical fiber connection relationship information.

19 Claims, 7 Drawing Sheets

METHOD AND SYSTEM FOR DETECTING OPTICAL FIBRE CONNECTION

CROSS REFERENCE TO RELATED APPLICATIONS

This application is the U.S. National Stage of International Patent Application No. PCT/CN2011/071925 filed on Mar. 17, 2011, which claims priority to Chinese Patent Application No. 201010147962.1 filed on Apr. 6, 2010. Both the PCT Application and Chinese Application are hereby incorporated by reference in their entirety.

FIELD OF THE INVENTION

The disclosure relates to the field of communication, and in particular to a method and a system for detecting optical fibre connection.

BACKGROUND OF THE INVENTION

With the development of the optical communication technology, people have higher and higher intelligent requirements for the optical network. The International Telecommunication Union (ITU) puts forward an intelligent switched optical network technology in March, 2000, wherein the basic idea is to introduce a control plane into the Optical Transport Network (OTN), so as to distribute network resources according to the needs, and to realize the intelligent optical network.

At present, the OTN management system has been evolved from a traditional Element Management System (EMS) to a Network Management System (NMS). The functions that the NMS can realize include: whole-network failure analysis and failure location, comprehensive whole-network performance analysis, providing end-to-end configuration and management of services based on wavelength or channel for users from the level of service operation and network management, etc. The realization of above functions is based on acquiring the optical fibre connection inside the network nodes in advance.

In related technologies, the optical fibre connection relationship inside the network is mostly acquired by manually configuring on the network manager one by one. However, the optical fibre connection is likely to be configured wrongly or insufficiently via the manual configuration of the network manager. Especially, under the condition of large number of network dimensions, large number of the same single boards and large number of ports, the possibility of error becomes higher. And, because the workload is higher due to more elements, wrong configuration of the optical fibre connection relationship can hardly be detected. For example, a single-point four-dimensional Reconfigurable Optical Add Drop Multiplexer (ROADM) element has approximately 70 optical fibre connections therein. Once the number of elements is increased to dozens or more, it requires very heavy and complicated workload to manually search for the few wrongly-configured or insufficiently-configured optical fibre connections in the hundreds and thousands of optical fibre connections. In addition, it is hard for the optical fibre connections which are manually configured by the network manager to stay consistent with the actual optical fibre connections, or to be automatically and synchronously updated. Thus, the cost of network construction and maintenance is increased.

SUMMARY OF THE INVENTION

The main purpose of the disclosure is to provide a solution for detecting optical fibre connection, in order to solve one of the above problems.

In order to realize the purpose, according to one aspect of the disclosure, a method for detecting optical fibre connection is provided.

The method for detecting optical fibre connection according to the disclosure comprises steps of: a single board judging whether received connection information of a downstream single board, received connection information of an upstream single board and connection information of the single board are reported current optical fibre connection relationship information; and if not the reported current optical fibre connection relationship information, reporting the received connection information of the downstream single board, the received connection information of the upstream single board and the connection information of the single board to a network management system; the network management system generating optical fibre matching connection relationship information of all single boards which are currently installed according to actual installation condition of the single boards, and determining whether the reported current optical fibre connection relationship information is correct optical fibre connection relationship according to the optical fibre matching connection relationship information; and if it is determined that the reported current optical fibre connection relationship information is the correct optical fibre connection relationship, the network management system marking information corresponding to the current optical fibre connection relationship information in the optical fibre matching connection relationship information, and displaying the current optical fibre connection relationship information; otherwise, the network management system prompting that the current optical fibre connection relationship information is wrong optical fibre connection relationship, and displaying an optimal optical fibre connection relationship information.

Preferably, before the single board judging whether the received connection information of the downstream single board, the received connection information of the upstream single board and the connection information of the single board are the reported current optical fibre connection relationship information, the method further comprises: the single board storing the connection information of the single board, sending the connection information of the single board to the downstream single board regularly, and receiving the connection information of the downstream single board; and the single board sending the connection information of the single board to the upstream single board after receiving the connection information of the upstream single board.

Preferably, determining whether the reported current optical fibre connection relationship information is correct optical fibre connection relationship according to the optical fibre matching connection relationship information comprises: when connection information of an optical port in the current optical fibre connection relationship information is empty, determining that the optical port has no optical fibre connection or the optical fibre connection of the optical port has been broken.

Preferably, before the network management system generating the optical fibre matching connection relationship information of all the single boards which are currently installed according to actual installation condition of the single boards, the method further comprises: the network management system storing matching connection relationship information of all the single boards and the optical ports of the single boards.

Preferably, the network management system displaying the optimal optical fibre connection relationship information comprises: acquiring and displaying the optimal optical fibre connection relationship information according to a single board type matching principle and/or an optical port type matching principle.

Preferably, the network management system displaying the optimal optical fibre connection relationship information comprises: acquiring and displaying the optimal optical fibre connection relationship information sequentially according to a single board minimum distance principle and/or an optical port number sequence principle.

Preferably, after the network management system determining whether the reported current optical fibre connection relationship information is correct optical fibre connection relationship according to the optical fibre matching connection relationship information, the method further comprises: the network management system displaying the current optical fibre connection relationship information and the optimal optical fibre connection relationship information on a user interface in a graphical or text data table form.

In order to achieve the purpose, according to another aspect of the disclosure, a system for detecting optical fibre connection is also provided.

A system for detecting optical fibre connection according to the disclosure comprises a single board processing device and a network management device, wherein the single board processing device comprises: a judgement module, configured to judge whether connection information of a single board, received connection information of a downstream single board and received connection information of an upstream single board are reported current optical fibre connection relationship information; and a reporting module, configured to report the connection information of the single board, the received connection information of the downstream single board and the received connection information of the upstream single board to the network management device under the condition that the judgement module determines that the connection information of the single board, the received connection information of the downstream single board and the received connection information of the upstream single board are not the reported current optical fibre connection relationship information; and the network management device comprises: a generation module, configured to generate optical fibre matching connection relationship information of all single boards which are currently installed according to actual installation condition of the single boards; a determination module, configured to determine whether the reported current optical fibre connection relationship information is correct optical fibre connection relationship according to the optical fibre matching connection relationship information; and a processing module, configured to mark information corresponding to the current optical fibre connection relationship information in the optical fibre matching connection relationship information under the condition that the determination module determines that the reported current optical fibre connection relationship information is the correct optical fibre connection relationship; and to prompt that the current optical fibre connection relationship information is wrong optical fibre connection relationship and to display an optimal optical fibre connection relationship information under the condition that the determination module determines that the reported current optical fibre connection relationship information is the wrong optical fibre connection relationship.

Preferably, the single board processing device further comprises: a single board information module, configured to store the connection information of the single board, and send the connection information of the single board to a single board output port monitoring module, a single board input port monitoring module and the judgement module; the single board output port monitoring module, configured to send the connection information of the single board to the downstream single board regularly, and send the connection information of the downstream single board to the judgement module regularly after receiving the connection information of the downstream single board; and the single board input port monitoring module, configured to send the connection information of the single board to the upstream single board after receiving the connection information of the upstream single board, and send the received connection information of the upstream single board to the judgement module regularly.

Preferably, the determination module is further configured to, when connection information of an optical port in the current optical fibre connection relationship information is empty, determine that the optical port has no optical fibre connection or the optical fibre connection of the optical port has been broken.

The solutions of the disclosure determine whether the current optical fibre connection relationship information which is reported by the single board is the correct optical fibre connection relationship according to the optical fibre matching connection relationship information of the single board, and put forward effective optical fibre matching connection suggestions if determining that the information is the wrong optical fibre connection relationship. The problem of increased cost for network construction and maintenance caused by wrongly and insufficiently configuring the optical fibre connection via manual configuration in the related technologies can be solved. The system performance and network stability can be improved.

BRIEF DESCRIPTION OF THE DRAWINGS

The drawings described herein are used for further understanding the disclosure and forms one part of the application. The schematic embodiments of the disclosure and the descriptions thereof are used for explaining the disclosure, but do not constitute undue limitation of the disclosure. In the drawings.

DETAILED DESCRIPTION OF THE EMBODIMENTS

The disclosure is described in detail hereinafter with reference to the drawings and embodiments. It should be noted that the embodiments of the application and the characteristics of the embodiments can be mutually combined if there is no conflict.

Figure 1:
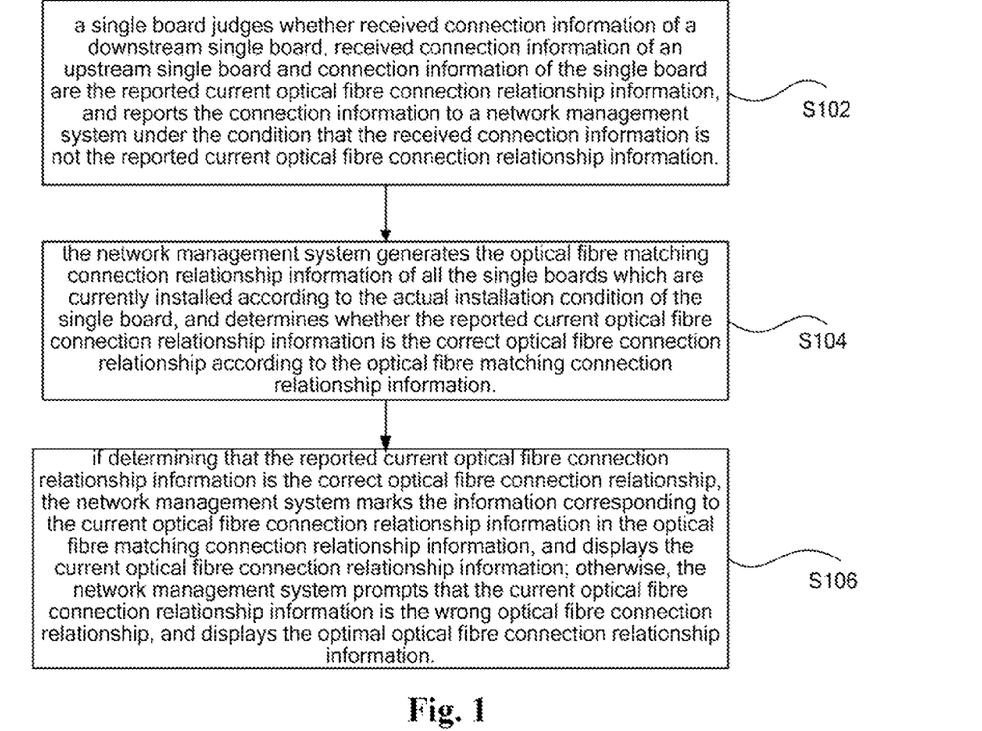
FIG. 1 shows a flowchart of a method for detecting optical fibre connection according to an embodiment of the disclosure.

FIG. 1 shows a flowchart of a method for detecting optical fibre connection according to an embodiment of the disclosure. As shown in FIG. 1, the method comprises the following Steps 102 to 106.

Step S102, a single board judges whether received connection information of a downstream single board, received connection information of an upstream single board and connection information of the single board are the reported current optical fibre connection relationship information, and reports the connection information to a network management system under the condition that the received connection information is not the reported current optical fibre connection relationship information;

Step S104, the network management system generates the optical fibre matching connection relationship information of all the single boards which are currently installed according to the actual installation condition of the single boards, and determines whether the reported current optical fibre connection relationship information is the correct optical fibre connection relationship according to the optical fibre matching connection relationship information; and Step S106, if determining that the reported current optical fibre connection relationship information is the correct optical fibre connection relationship, the network management system marks the information corresponding to the current optical fibre connection relationship information in the optical fibre matching connection relationship information, and displays the current optical fibre connection relationship information; otherwise, the network management system prompts that the current optical fibre connection relationship information is the wrong optical fibre connection relationship, and displays the optimal optical fibre connection relationship information.

In this embodiment, as the latest current optical fibre connection relationship information is reported to the network management system, the network management system determines whether the reported current optical fibre connection relationship information is the correct optical fibre connection relationship according to the optical fibre matching connection relationship information (namely, the possible optical fibre connection relationship information of all the optical ports) of the actually-installed single boards. The network management system gives the optimal optical fibre connection relationship information under the condition that the information is the wrong optical fibre connection relationship. The problem of increased cost for network construction and maintenance caused by wrongly and insufficiently configuring the optical fibre connection via manual configuration in the related technologies can be solved. The system performance and network stability can be improved.

Preferably, before the Step S102, the single board stores the connection information of the single board, sends the connection information of the single board to the downstream single board regularly, and receives the connection information of the downstream single board; and the single board sends the connection information of the single board to the upstream single board after receiving the connection information of the upstream single board.

This preferred embodiment can automatically acquire the actual optical fibre connection relationship inside the optical network, and displays the actual optical fibre connection relationship, so as to save the manual configuration operation on the network manager, saves the human resource and reduces the maintenance cost of the system.

Preferably, before the Step S104, the network management system stores the matching connection relationship information of all the single boards and the optical ports thereof. Thus, the network management system can generate the optical fibre matching connection relationship information of all the current actually-installed single boards according to the stored matching connection relationship information of all the single boards and the optical ports thereof and the actual installation conditions of the single boards. And the network management system can use the optical fibre matching connection relationship information to judge whether the reported current optical fibre connection relationship information is the correct connection relationship. Thereby, this solution has simple implementation and high operability.

Preferably, in the Step S104, it can determine that the optical port has no optical fibre connection or the optical fibre connection of the optical port has been broken when the connection information of the optical port in the current optical fibre connection relationship information is empty. The hard-to-detect conditions, such as that the optical fibre is broken, or one end of the single board port is unconnected etc., can be rapidly and effectively detected via the method. Thus, the failure location function and efficiency of the system can be improved.

Preferably, after the Step S104, the network management system can display the current optical fibre connection relationship information and the optimal optical fibre connection relationship information on the user interface in a graphical or text data table form.

Preferably, in the Step S106, if determining that the reported current optical fibre connection relationship information is the wrong optical fibre connection relationship, the network management system acquires and displays the optimal optical fibre connection relationship information according to the single board type matching principle and/or the optical port type matching principle; or, the network management system sequentially acquires and displays the optimal optical fibre connection relationship information according to the single board minimum distance principle and/or the optical port number sequence principle.

This preferred embodiment shows that under the condition of detecting the wrong optical fibre connection relationship, according to some principle, the network management system can acquire the optimal optical fibre connection relationship information of the single board which is related to the wrong optical fibre connection relationship from the optical fibre matching connection relationship information. And the network management system can suggest the effective single board connection relationship to the maintainers, so as to help the system to correct the optical fibre connection, and to reduce the cost for network maintenance.

Figure 2:
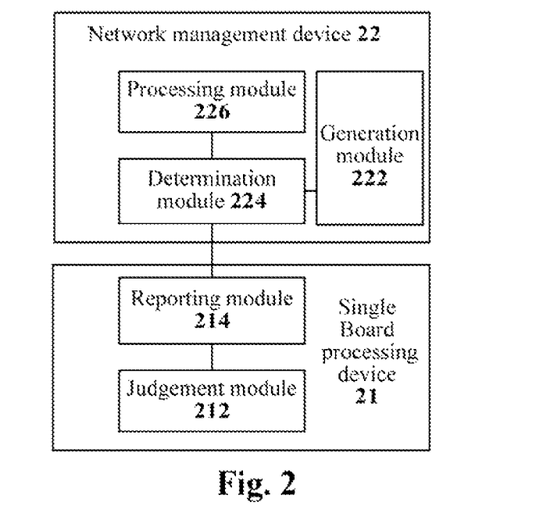
FIG. 2 shows a structure diagram of a system for detecting optical fibre connection according to an embodiment of the disclosure.

Corresponding to the above embodiment, the disclosure provides a system for detecting optical fibre connection. FIG. 2 shows a structure diagram of a system for detecting optical fibre connection according to an embodiment of the disclosure. The system comprises a single board processing device 21 and a network management device 22; the single board processing device 21 comprises a judgement module 212 and a reporting module 214; the network management device 22 comprises a generation module 222, a determination module 224 and a processing module 226. The system will be described below in detail.

The single board processing device 21 comprises: the judgement module 212, which is configured to judge whether the connection information of the single board, the received connection information of the downstream single board and the received connection information of the upstream single board are the reported current optical fibre connection relationship information; the reporting module 214, which is coupled with the judgement module 212, and is configured to report the connection information to the network management device under the condition that the judgement module determines that the connection information of the single board, the received connection information of the downstream single board and the received connection information of the upstream single board are not the reported current optical fibre connection relationship information.

The network management device 22 comprises: the generation module 222, which is configured to generate the optical fibre matching connection relationship information of all the single boards which are currently installed according to the actual installation condition of the single board; the determination module 224, which is coupled with the generation module 222 and the reporting module 214, and is configured to determine whether the reported current optical fibre connection relationship information is the correct optical fibre connection relationship according to the optical fibre matching connection relationship information; and the processing module 226, which is coupled with the determination module 224, and is configured to mark the information corresponding to the current optical fibre connection relationship information in the optical fibre matching connection relationship information, under the condition that the determination module 224 determines that the information is the correct optical fibre connection relationship; and to prompt that the current optical fibre connection relationship information is the wrong optical fibre connection relationship and to display the optimal optical fibre connection relationship information, under the condition that the determination module 224 determines that the information is the wrong optical fibre connection relationship.

In related technologies, the few optical fibre connections which are configured wrongly or insufficiently are manually searched from hundreds of optical fibre connections or even more. However, in this embodiment, the single board processing device 21 reports the latest current optical fibre connection relationship information to the network management device 22. And then the determination module 224 determines whether the current optical fibre connection relationship information reported by the single board processing device 21 is the correct optical fibre connection relationship according to the optical fibre matching connection relationship information of the actually-installed single boards (namely, possible optical fibre connection relationship information of all the optical ports). The optimal optical fibre connection relationship information (namely, the effective optical fibre matching connection suggestion) is given under the condition of determining that the information is the wrong optical fibre connection relationship. Thereby, the problem of increased cost for network construction and maintenance caused by wrongly and insufficiently configuring the optical fibre connection via manual configuration in the related technologies can be solved. The system performance and network stability can be improved.

In addition, this preferred embodiment shows that under the condition of detecting the wrong optical fibre connection relationship, the network management system 22 can acquire the optimal optical fibre connection relationship information of the single board which is related to the wrong optical fibre connection relationship from the optical fibre matching connection relationship information according to the above principle. Thus, the effective and suggestive single board connection relationship is provided for the maintainers, so as to help the system to correct the optical fibre connection, and to reduce the cost for network maintenance.

It should be noted that, the above connection information of the single board can be the "connection information packet" that encapsulates the attribute information, including the optical interface usage information.

Figure 3:
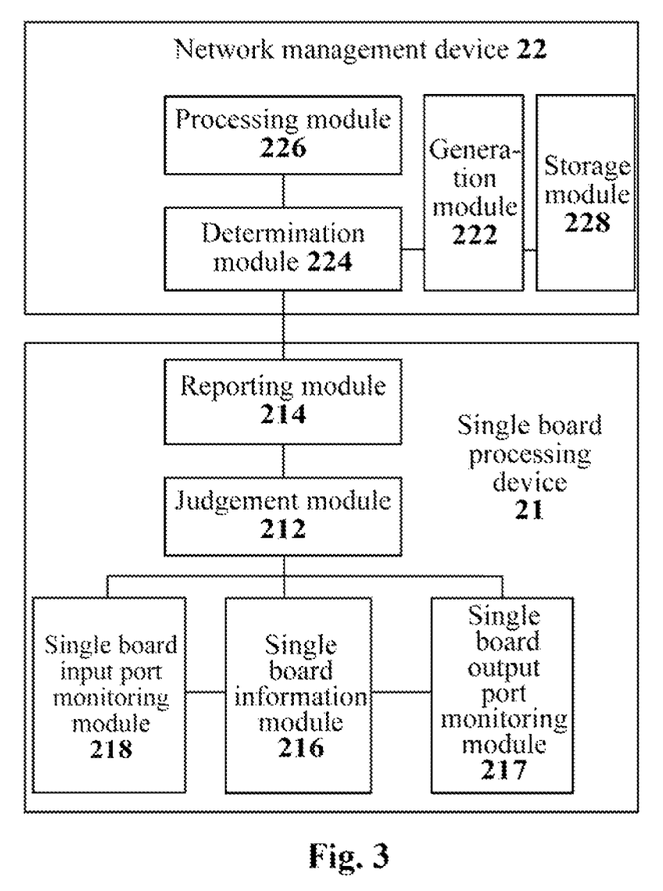
FIG. 3 shows a structure diagram of a system for detecting optical fibre connection according to a preferred embodiment of the disclosure.

FIG. 3 shows a structure diagram of a system for detecting optical fibre connection according to a preferred embodiment of the disclosure.

Preferably, the single board processing device 21 further comprises: a single board information module 216, a single board output port monitoring module 217 and a single board input port monitoring module 218.

The single board information module 216 is coupled with the single board output port monitoring module 217, the single board input port monitoring module 218 and the judgement module 212, and is configured to store the connection information of the single board, and to send the connection information of the single board to the single board output port monitoring module 217, the single board input port monitoring module 218 and the judgement module 212; the single board output port monitoring module 217 is coupled with the judgement module 212, and is configured to send the connection information of the single board to the downstream single board regularly, and to send the connection information to the judgement module 212 regularly after receiving the connection information of the downstream single board; and the single board input port monitoring module 218 is coupled with the judgement module 212, and is configured to send the connection information of the single board to the upstream single board after receiving the connection information of the upstream single board, and to send the received connection information of the upstream single board to the judgment module 212 regularly.

The preferred embodiment can automatically acquire the actual optical fibre connection relationship inside the optical network via the single board output port monitoring module 217 and the single board input port monitoring module 218. The network management device 22 can display the actual optical fibre connection relationship. Hence, the manual configuration operations on the network manager are saved, the human resources are saved and the maintenance cost of the system is reduced.

In the preferred embodiment, the network management device 22 records the current correct optical fibre connection relationship, so as to conveniently determine that the current optical fibre connection relationship is an effective connection, and to determine which optical ports have been used. Thus, it is beneficial for implementing correct judgement in the following operation process, for real-timely and effectively showing the actual optical fibre connection state, and for improving the efficiency and usability of the system.

Preferably, the optimal optical fibre connection relationship information can be acquired and displayed according to the single board type matching principle and/or the optical port type matching principle (wherein the single boards capable of being matched are matched based on the minimum distance principle, and the ports capable of being matched are sequentially matched according to the ascending sequence of the optical port number).

Preferably, the determination module 224 is further configured to determine that the optical port has no optical fibre connection or the optical fibre connection of the optical port has been broken when the connection information of the optical port in the current optical fibre connection relationship information is empty. Thus, the hard-to-detect conditions, such as that the optical fibre is broken, one end of the single board port is unconnected etc. can be rapidly and effectively detected, and the failure location function and efficiency of the system can be improved.

Preferably, the network management device 22 further comprises: a storage module 228, which is coupled with the generation module 222, and is configured to store the matching connection relationship information of all the single boards and the optical ports thereof. Thereby, the network management device 22 can generate the optical fibre matching connection relationship information of all the current actually-installed single boards according to the stored matching connection relationship information of all the single boards and the optical ports thereof and the actual installation condition of the single boards. The network management device 22 uses the optical fibre matching connection relationship information to judge whether the reported current optical fibre connection relationship information is the correct connection relationship. This solution has simple implementation and high operability.

In addition, the processing module 226 also can display the current optical fibre connection relationship information and the optimal optical fibre connection relationship information on the user interface in the graphical or text data table form. In particular, the correct current optical fibre connection relationship information, the wrong current optical fibre connection relationship information and the suggested optimal optical fibre connection relationship information can be identified by different colours. Thus, the detection result can be more direct, the actual operation of the maintainers can be more convenient, and the user experience can be improved.

Multiple preferred embodiments of the disclosure are described below. These preferred embodiments comprehensively adopt the technical solutions of the above embodiments.

Preferred Embodiment 1

Figure 4:
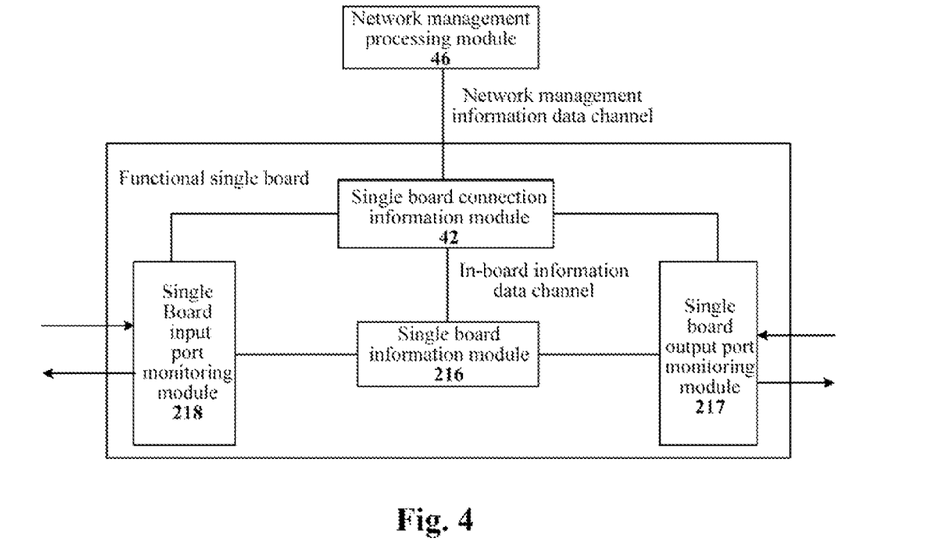
FIG. 4 shows a diagram of each module of a detection system according to the preferred embodiment 1 of the disclosure.

The system for detecting optical fibre connection (called as fibre connection for short below) according to the preferred embodiment 1 of the disclosure automatically acquires and displays the optical fibre connection of actual physical connection on the network manager, and gives suggestive prompt information for the wrong connection and insufficient connection condition. FIG. 4 shows a diagram of all the modules of a detection system according to the preferred embodiment 1 of the disclosure. As shown in FIG. 4, the detection system comprises: the single board information module 216, the single board output port monitoring module 217, the single board input port monitoring module 218, the single board connection information module 42 and the network management processing module 46. That is, after the actual physical single boards are installed and the optical fibres are connected, the input port monitoring module 218 and the output port monitoring module 217 inside each of the single boards can monitor the "connection information packet" information sent from the upstream or downstream single board, and then send this information and the connection information of the single board to the single board connection information module 42. The single board connection information module 42 reports the current optical fibre connection relationship of the single board to the network management device 22. The network management device 22 judges the connection relationship according to the network management actually-installed board connection relationship data table consisting of the information of the actually-installed single boards. For correct connection relationship, the network management device 22 displays it in the graphical or text data table form; and for the wrong fibre connection or insufficient fibre connection condition, the network management device 22 gives a suggestive connection relationship. As shown in FIG. 4, the functions of each module of the preferred embodiment 1 are described in detail below.

(1) Single Board Information Module 216

The main function is to store some attribute information of the single board, including: node Identification (ID) of the network element which the single board belongs to, address information of the single board, single board type information, attribute information of the optical interface etc. In this case, the node ID of the network element which the single board belongs to is mainly configured to mark the node ID of the network element which the single board is located in; the address information of the single board, namely, the physical address representing the single board, can adopt the normal encoding mode of "frame number+sub-frame number+slot position number"; the single board type information represents the functions of the single board (such as amplification type single board, service type single board, etc.); and the attribute information of the optical interface represents the attribute information of some optical interfaces contained by the single board, including the number information of the optical interface, the direction information of the optical interface, the sequential number information of the optical interface, the wavelength information of the optical interface, the rate information of the optical interface, the usage information of the optical interface etc. Specifically, each part of the attribute information of the optical interface can represent the following meanings: the number information of the optical interface represents the number of the input optical interfaces and output optical interfaces of the single board; the direction information of the optical interface represents whether the optical interface is the input interface or the output interface, and if it is the input interface and has the optical fibre connection relationship, the single board is marked as the downstream single board in the optical fibre connection relationship; and if it is the output interface and has the optical fibre connection relationship, the single board is marked as the upstream single board in the optical fibre connection relationship; the sequential number information of the optical fibre represents the numbering sequence corresponding to each optical interface; the wavelength information of the optical interface represents the wavelength channel information corresponding to the optical interface; the rate information of the optical interface represents the corresponding bearing rate of the optical interface; and the usage information of the optical interface represents which input interfaces and output interfaces of the single board currently have optical fibre connection, and which ports are remained to be available.

In conclusion, this module sends some attribute information of the single board to the single board input port monitoring module 218 and the single board output port monitoring module 217 respectively. The single board input port monitoring module 218 and the single board output port monitoring module 217 encapsulate the information in the "connection information packet", send the "connection information packet" to the upstream or downstream single boards which have the connection relationship. Meanwhile, this information is also sent to the single board connection information module 42 of the single board to provide the related information of the optical fibre connection relationship which the local end needs.

(2) Single Board Output Port Monitoring Module 217

Figure 5:
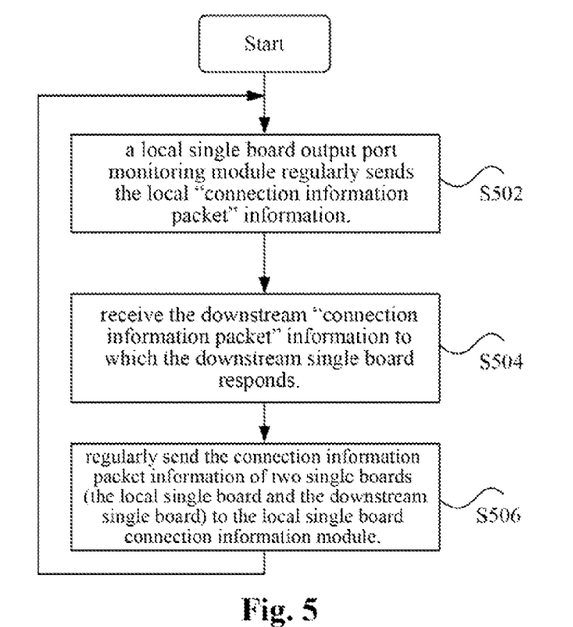
FIG. 5 shows a flowchart of a single board output port monitoring module according to the preferred embodiment 1 of the disclosure.

FIG. 5 shows a flowchart of a single board output port monitoring module according to the preferred embodiment 1 of the disclosure. As shown in FIG. 5, the module implements the following processing.

Step S502, the single board output port monitoring module 217 makes the output optical ports which are used by the single board send the "connection information packet" information to the downstream single board, wherein the information contained in the "connection information packet" is the information stored in the single board information module 216. The single board output port monitoring module 217 modulates the "connection information packet" information to a fixed carrier, and then sends the information via a main optical channel (actual optical fibre). If there is an actual optical fibre connection downstream, the input port monitoring module 218 of the downstream single board can encapsulate some attribute information of the downstream single board, the current input optical port condition of the downstream single board etc. into the form of the "connection information packet" of the downstream single board, and then sends the "connection information packet" back.

Step S504, receiving the "connection information packet" returned by the downstream single board, and then demodulating and resolving the "connection information packet".

Step S506, sending to the single board connection information module 42 the received "connection information packet" of the downstream single board and the related connection information packet of the single board. In particular, if there is no optical fibre connection downstream, or the downstream optical fibre is broken, then the response information monitored by the single board output port monitoring module 217 is empty. And then the single board output port monitoring module 217 sends this information (without receiving the response "connection information packet") and the related connection information of the single board to the single board connection information module 42 of the single board.

(3) Single Board Input Port Monitoring Module 218

Figure 6:
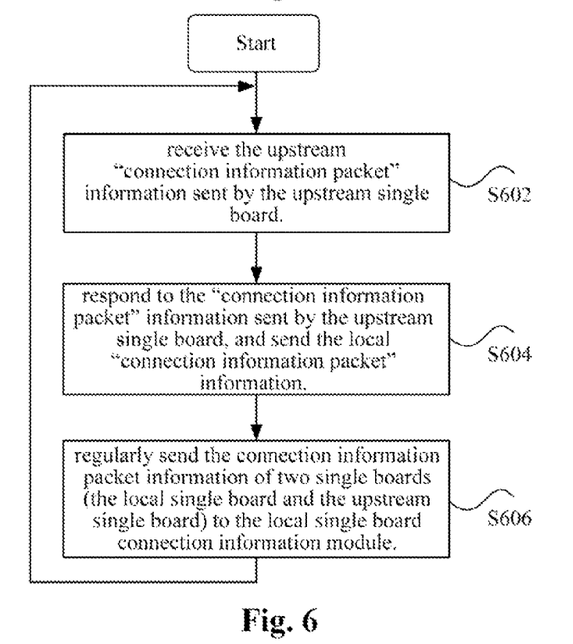
FIG. 6 shows a flowchart of a single board input port monitoring module according to the preferred embodiment 1 of the disclosure.

FIG. 6 shows a flowchart of a single board input port monitoring module according to the preferred embodiment 1 of the disclosure. As shown in FIG. 6, the single board input port monitoring module 218 makes all the input optical ports of the single board monitor regularly (for example, every three seconds), and receive and respond to the "connection information packet" sent by the upstream single board. The module implements the following processing.

Step S602, the single board input port monitoring module 218 receives and demodulates the "connection information packet" sent by the upstream single board.

Step S604, responding a "connection information packet" of the single board to the upstream single board, modulating the information packet to a fixed carrier, and then sending out the information packet.

Step S606, sending the "connection information packet" of the upstream single board and the related connection information packet condition of the local single board to the single board connection information module of the single board. If all the input ports do not receive the "connection information packet", the single board input port monitoring module 218 sends the information (that the input ports do not receive any "connection information packet") and the related connection information packet of the single board to the single board connection information module of the single board.

(4) Single Board Connection Information Module 42

Figure 7:
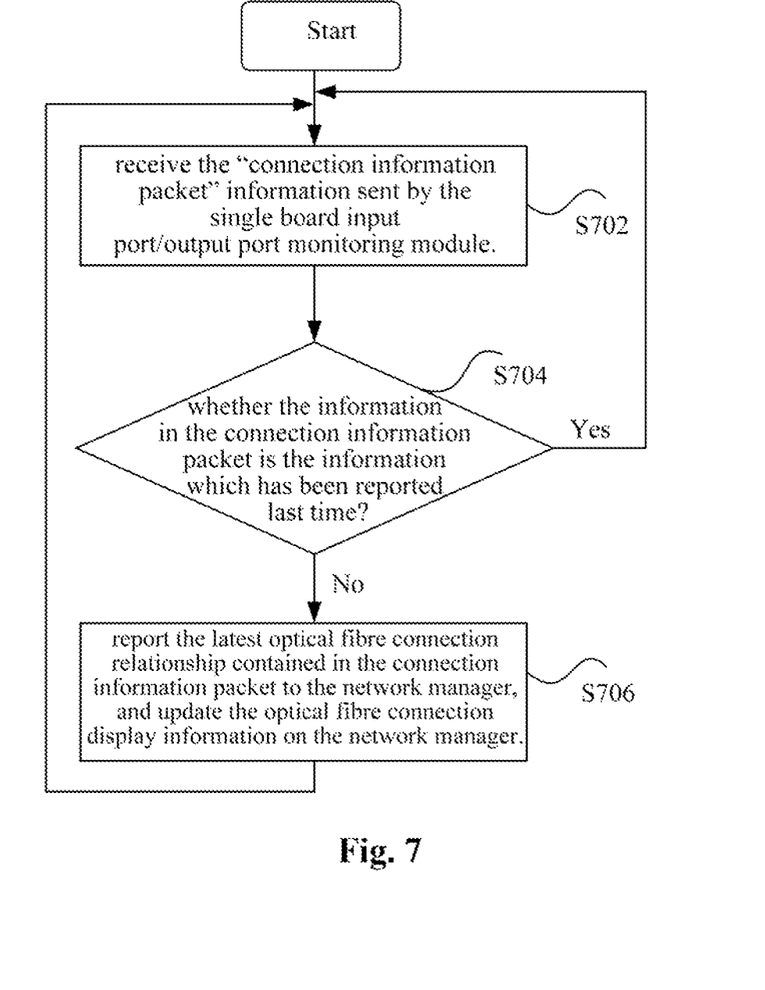
FIG. 7 shows a flowchart of a single board connection information module according to the preferred embodiment 1 of the disclosure.

FIG. 7 shows a flowchart of a single board connection information module according to the preferred embodiment 1 of the disclosure. As shown in FIG. 7, the module implements the following processing.

Step S702, receiving the "connection information packet" information sent by the single board input port monitoring module 218 and the single board output port monitoring module 217.

Step S704, judging whether the information in the connection information packet is the related information which has been reported to the network management device 22 last time. If it is, the single board connection information module does not consider the information, and does not report the information to the network management device 22.

Step S706, if the information contained in the information packet is inconsistent with the information which has been reported last time, it represents that there is latest optical fibre connection information; reporting the latest optical fibre connection information to the network management device 22, and updating the optical fibre connection database and the optical fibre connection display information on the network management device 22.

(5) Network Management Processing Module 46

Figure 8:
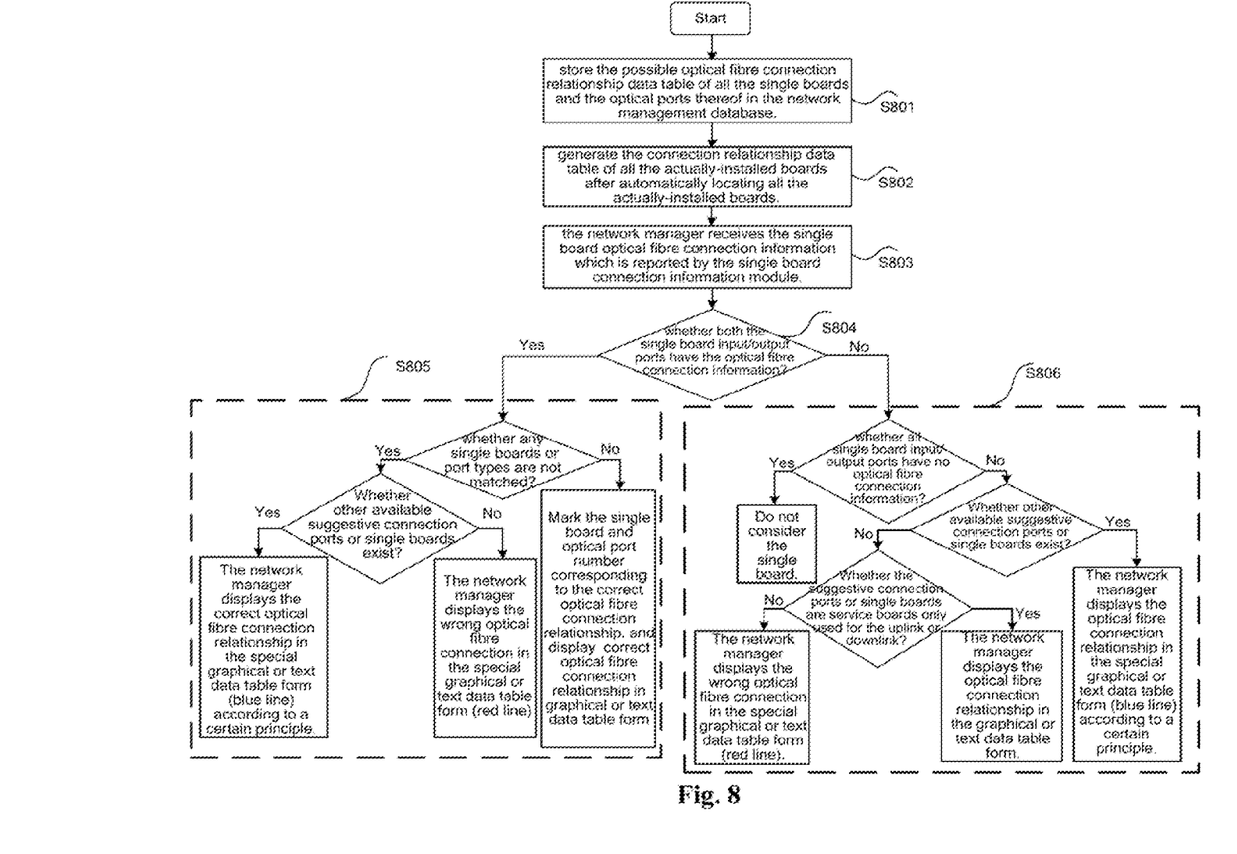
FIG. 8 shows a flowchart of a network management processing module according to the preferred embodiment 1 of the disclosure.

FIG. 8 shows a flowchart of a network management processing module according to the preferred embodiment 1 of the disclosure. As shown in FIG. 8, the network management processing module 46 judges and checks the optical fibre connection information reported by the single board connection information module 42, gives a suggestive connection relationship under the condition that there are the wrong connection and insufficient connection and there exist other downstream single boards and ports available, and correspondingly displays all the above results on the network management device 22. The module implements the following processing.

Step S801, storing a possible fibre connection relationship data table of all the single boards and optical ports thereof in the database of the network management device 22.

Step S802, after automatically locating all the actually-installed boards on the network management device 22, the network management device 22 generates a new optical fibre connection relationship data table of actually-installed boards which contains all the possibilities according to the current actually-installed single board types and all the optical ports thereof.

Step S803, the network management device 22 receives the latest fibre connection relationship of the actual single boards which is reported by the single board connection information module 42.

Step S804, judging whether both the single board input port and output port have optical fibre connection. If yes, implement Step S805; otherwise, implement Step S806.

Step S805, searching for the optical fibre connection in the optical fibre connection relationship data table of actually-installed boards (that is, judging whether there are mismatched single board types or port types). When it is found that the optical fibre connection is possible (that is, the judgement result is no), the network management device 22 marks the corresponding single board and optical port number of the optical fibre connection in the optical fibre connection relationship data table of actually-installed boards (representing that the port has had the correct optical fibre connection information), and displays the correct connection information on the interface of the network management device 22 in the graphical or data table form. When no possible optical fibre connection is found in the optical fibre connection relationship data table of actually-installed boards (that is, the judgement result is yes), it means that this connection relationship is wrong.

It also can search the optical fibre connection relationship data table of actually-installed boards to find out whether other available and suggestive connection ports or single boards exist after determining that this connection relation is wrong. If there is no other port or single board, the network management device 22 displays the wrong connection relation on the interface of the network management device 22 in the special graphical or data table form (for example, the line colour for optical fibre connection is red); otherwise, the network management device 22 gives a suggestive optimal optical fibre connection relationship according to a principle. In this case, the principle can be selecting the single board and the optical port based on the principle that the single board type is matched, and the optical port type is matched; that is, first implementing the suggestive matching for the output optical port of the upstream single board, and then implementing the suggestive matching for the input optical port of the downstream single board. The single boards capable of being matched are matched according to the minimum distance principle. If there are multiple single boards capable of being matched which have the same type, the corresponding single board capable of being matched is selected by following the principle that "the single board on the upper side is the upstream single board, the single board on the lower side is the downstream single board; the single board on the left side is the upstream single board, the single board on the right side is the downstream single board; the single board on the upper left side is the upstream single board, the single board on the lower right side is the downstream single board; the single board on the upper right side is the upstream single board, and the single board on the lower left side is the downstream single board". Multiple ports capable of being matched are matched sequentially according to the ascending sequence of the optical port number. However, the single boards and the related optical ports corresponding to this optical fibre connection relationship are not marked in the optical fibre connection relationship data table of actually-installed boards.

Step S806, when the connection information packet, which is reported to the network management device 22 by the single board connection information, contains the condition that only one end of a single board has the optical fibre connection (such condition can be that actually only one end of the single board has optical fibre connection, and the other end has no optical fibre connection; and also can be that the input port and output port of the single board both have optical fibre connection, but the optical fibre on one end is broken), the network management device 22 can give a suggestive optimal optical fibre connection relationship to the end without optical fibre connection relationship according to the above principle. But, the network management device 22 will not mark the single board and the related optical ports corresponding to the optical fibre connection relationship in the optical fibre connection relationship data table of actually-installed boards. For some service boards, it needs to further judge whether these service boards are the boards only used for the uplink or downlink.

When the connection information packet reported to the network management device 22 by the below single board connection information contains the situation that both ends of a single board have no optical fibre connection relationship (such condition can be that both ends of the actual single board have no optical fibre connection, and also can be that there is optical fibre connection, but the optical fibre is broken), the network manager does not consider the single board.

The preferred embodiment not only can automatically find the actual optical fibre connection relationship, saves the operation of manually configuring the optical fibre on the network management device 22, but also can check and give warning information for the condition that there is the wrong connection or one end of the single board port is unconnected. This preferred embodiment can also give suggestive optical fibre connection relationship, and especially can provide excellent discovery and locating functions for the conditions such as hard-to-detect broken optical fibre.

Preferred Embodiment 2

The preferred embodiment 2, which is applied inside the optical network, can automatically locate the actual optical fibre connection relationship and can prompt the related content after the actual physical optical fibre is connected. The detection flow of the optical fibre connection of the preferred embodiment 2 is described in detail below.

First, the actual single boards and actual optical fibre connection can be installed based on that the upstream/downstream single boards are installed according to the principle of proximity. After automatically locating the information of all the actually-installed boards, the network management device 22 takes "intersection" with a possible fibre connection relationship data table of all the optical ports of all the single boards, which inherently exists in the network management device 22, thus to generate an optical fibre connection relationship data table of actually-installed boards.

Second, the single board input port monitoring module 218 and the output port monitoring module 217 respectively monitor and send the corresponding "connection information packet" information. In this case, the single board output port monitoring module 217 regularly (or periodically) sends the "connection information packet" information, which is related to the attributes of the single board and the actual optical fibre connection condition of the current single board, to the downstream single board. Then, after receiving the "connection information packet" responded by the downstream single board, the single board output port monitoring module 217 sends the "connection information packet" information of the response together with the "connection information packet" of the single board to the single board connection information module. The single board input port monitoring module 218 regularly (or periodically) monitors and receives the "connection information packet" information sent by the upstream single board, responds the "connection information packet" information which is related to the response information of the single board, and reports the "connection information packet" information of the upstream single board and the "connection information packet" information of the single board to the single board connection information module of the single board.

Third, after receiving the "connection information packet" information sent by the single board input port monitoring module 218 and the single board output port monitoring module 217, the single board connection information module 42 judges whether the single board optical fibre connection relationship shown in the "connection information packet" is the optical fibre connection relationship which has been reported to the network management device 22 last time. If it is, do not report it to the network management device 22 (that is, the single board connection information module does not consider the information); otherwise, report this latest optical fibre connection relationship to the network management device 22.

Fourth, when receiving the latest fibre connection information reported by the single board connection information module 42, the network management processing module 46 judges various conditions of the single board optical fibre connection one by one according to the possible fibre connection relationship data table of all the single boards and the optical ports thereof stored in the database of the network management device 22. For correct optical fibre connection relationship, the network management processing module 46 can normally display the correct optical fibre connection relationship on the interface of the network management device 22, and correspondingly marks the single boards and ports corresponding to this connection information in the optical fibre connection relationship data table of actually-installed boards. For the condition of wrong connection or insufficient connection, the network management device 22 can specially display it on the interface, and gives a suggestive optical fibre connection relationship under the condition that other available ports and single boards exist.

This preferred embodiment saves a large number of human resources, improves the system efficiency, reduces the maintenance cost of the system, and also is an important solution for the intelligent switched optical network to evolve from the Soft Permanent Connection (SPC) service to the Switched Connection (SC) service.

Preferred Embodiment 3

Figure 9:
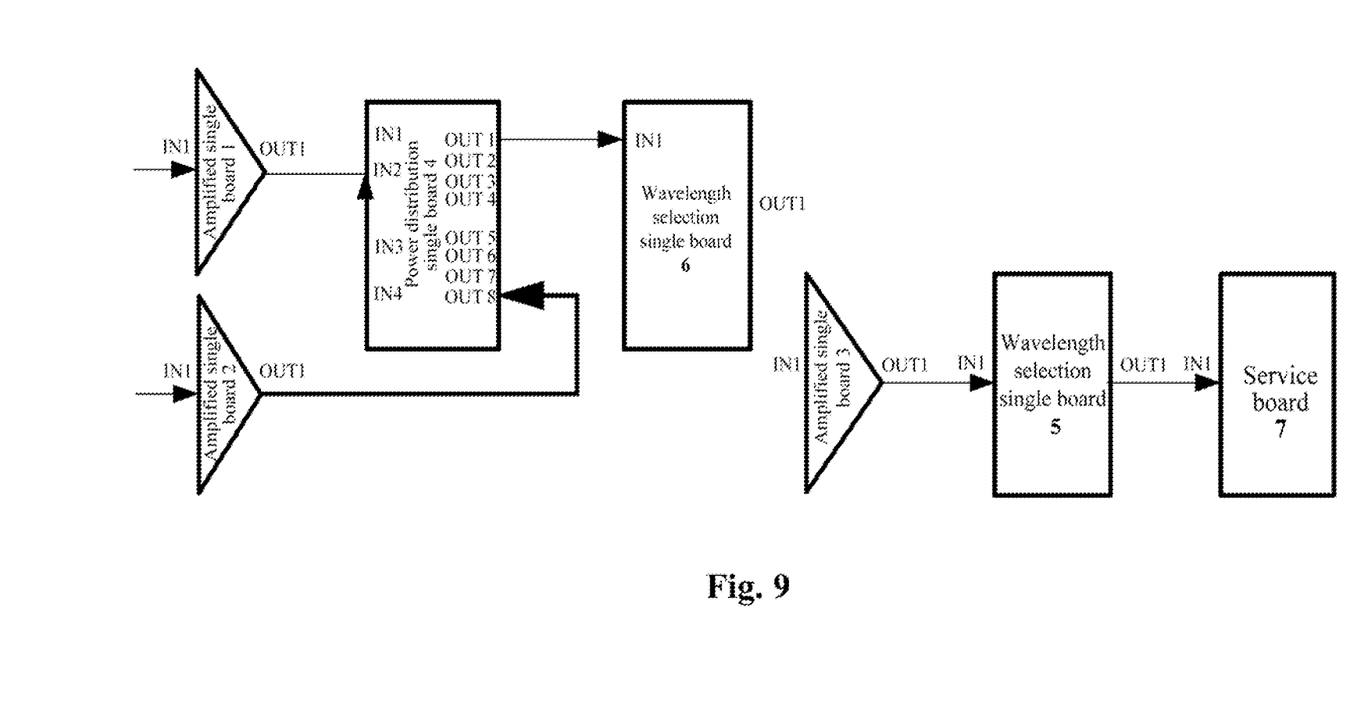
FIG. 9 shows a diagram of optical fibre connection inside a Wavelength Switched Optical Network (WSON) system element according the preferred embodiment 3 of the disclosure.

FIG. 9 shows a diagram of optical fibre connection inside a network element of the Wavelength Switched Optical Network (WSON) system according to the preferred embodiment 3 of the disclosure. As shown in FIG. 9, by adopting the preferred embedment, the network management device 22 not only can automatically locate the actual optical fibre connection relationship, but also can give corresponding prompt information and a suggestive connection relationship for the condition that there is wrong optical fibre connection relationship or only one end has the optical fibre connection relationship. For example, the optical fibre connection relationship between the OUT1 port of the amplification single board 1 and the IN2 port of the power distribution single board 4 in FIG. 9 is correct. The optical fibre connection relationship between the OUT1 of the amplification single board 2 and the OUT8 port of the power distribution single board 4 is wrong. And, there is no optical fibre connection relationship between the OUT1 port of the wavelength selection single board 6 and the IN1 port of the amplification single board 3. The processing flow of the preferred embodiment is described in detail below.

After planning the single board, installing the upstream/downstream single board according to the principle of proximity, and connecting the optical fibre, first, there is a possible fibre connection relationship data table of all the single boards and optical ports thereof in the database of the network management device 22. After automatically locating the information of all the actually-installed boards, the network management device 22 generates a new optical fibre connection relationship data table of actually-installed single board type and all the optical ports thereof. And meanwhile, the single board information module in each single board can generate the attribute information of the single board and the optical port usage condition of the current single board etc., that is, generates the information which should be contained in the "connection information packet" sent by the single board. For example, the information of the single board information module in the amplification single board 1 on the 0-1-10 slot position is shown in the following table, and other single boards have similar information.

| Name of the single board attribute | | Information content |
|---|---|---|
| Node ID of the network element which the single board belongs to | | 10.10.10.1 |
| Address information of the single board | | 0-1-10 (0 frame1sub-frame 10slot position) |
| Type information of the single board | | XX type amplification single board |
| Attribute information of the optical interface | Number information of the optical interface | 4 optical ports (IN1 port, IN2 port, OUT1 port, OUT2 port) |
| | Direction information of the optical interface | IN1 port and IN2 port are input ports, OUT1 port and OUT2 port are optical output ports |
| | Sequence information of the optical interface | no (identifying multiple ports with the same type by using the sequence information) |
| | Wavelength information of the optical interface | optical multiplex section signal, not corresponding to any specific wavelength |
| | Rate information of the optical interface | optical multiplex section signal, not corresponding to any specific rate |
| | Usage condition of the optical interface | IN1 port and OUT1 port are in use (optical fibre connection is detected), and IN2 port and OUT2 port are not in use. |

And then, the single board output port monitoring module in the single board modulates the single board information of the single board to a certain fixed carrier. Then, the single board output port monitoring module sends the information via all the output optical ports. For the output ports with the optical fibre connection relationship, the modulated information can be sent out via the actual optical fibre. But for the output ports without the actual optical fibre connection relationship, the modulated information cannot be sent out. The upstream single board can receive a responded "connection information packet" under normal condition, after regularly (for example, every three seconds) sending the optical fibre connection relationship of the single board. All the input ports monitor and receive the "connection information packet" condition sent by the upstream single board, and respond a "connection information packet" which contains the related information of the single board under the normal optical fibre connection condition.

In this preferred embodiment, the single board output port monitoring module 217 of the amplification single board 1 modulates the related information of the single board to a fixed carrier, and then sends out the information via all the output ports of the single board—OUT1 port and OUT2 port. For the OUT1 port, the modulated information can be sent to the IN2 port of the power distribution single board 4 of the opposite end because of the actual optical fibre connection. For the OUT2 port, the modulated information cannot be sent out without actual optical fibre connection. In addition, the OUT1 port can receive a "connection information packet" responded by the IN2 port of the power distribution single board 4 of the downstream single board after sending the "connection information packet" of the single board, wherein the information packet contains some attribute information of the current power distribution single board 4 and the usage condition of the input optical ports (for example, the IN2 port is connected with the OUT1 port of the amplification single board 1; but the other input optical ports IN1, IN3 and IN4 are not connected with optical fibres, so as to be idle and available). For the input ports—IN1 and IN2, the IN1 port can receive the "connection information packet" information sent by the upstream single board, and then sends the related information of the single board after modulating the related information to a fixed carrier, that is, responds the "connection information packet" information of the single board. The IN2 port cannot monitor the "connection information packet" because of no optical fibre connection. And then, the single board information module 216, the single board input port monitoring module 218 and the single board output port monitoring module 217 of the amplification single board 1 can respectively and regularly (for example, every four seconds) report the related attribute information of the current single board and the received upstream and downstream connection information packet to the single board connection information module 42. The single board connection information module 42 first judges whether the received connection information packet information is the one which has been reported to the network management device 22 last time; if it is, report the information; otherwise, do not report. Because it is the first time to report the connection information, the information packet information needs to be reported to the network management device 22. The condition of the amplification single board 2 is similar, except that the connection information packet received by the OUT1 port thereof is sent from the OUT8 port of the power distribution single board 4, and the connection information contained in the information packet is that the OUT1 port of the amplification single board 2 is connected with the OUT8 port of the power distribution single board 4. The single board information module 216 in the power distribution single board 4 includes all the information which it is supposed to have at present. Then the output port information monitoring module 217 of the power distribution single board 4 can modulate the information in the single board information module 216 to a fixed carrier, and then sends out the information via all the output optical ports (for example, the output optical ports are OUT1 to OUT8). Because only the OUT1 port and the OUT8 port have the optical fibre connection relationship, the "connection information packet" information sent by the optical ports can be sent to the single boards and ports which are connected therewith, and the responded "connection information packet" information can be received. Only the IN2 port of the input port of the power distribution single board 4 can monitor the "connection information packet" information, and the IN1 port, IN3 port and IN4 port cannot receive the connection information packet. It represents that the IN1 port, IN3 port and IN4 port are idle and available, and have no optical fibre connection relationship. And then the single board information module 216, the single board input port monitoring module 218 and the output port information monitoring module 217 of the power distribution single board 4 can respectively and regularly (for example, every four seconds) report the current connection information packet information of the local single board, the upstream single boards and the downstream single boards to its single board connection information module 42. The single board connection information module 42 first judges whether the received connection information packet information is the information which has been reported to the network management device 22 last time if it is, report the information, otherwise, do not report the information. Because it is the first time to report the connection information, the single board connection information module 42 will report the above information packet information, which includes all the optical fibre connection relationships. The wavelength selection single board 6 also can implement the above flows. The optical fibre connection relationship information is that only the input port IN1 port of the wavelength selection single board 6 has the optical fibre connection relationship, and the output port thereof has no optical fibre connection relationship.

After receiving the above single board attribute information and the optical fibre connection relationship information, the network management device 22 first compares the information with the information in the optical fibre connection relationship data table of actually-installed boards, and finds that for the optical fibre connection between the OUT1 port of the amplification single board 1 and the IN2 port of the power distribution single board 4, the information such as the single board type, the optical port type, the information rate etc. is matched, and this connection exists in the optical fibre connection relationship data table of actually-installed boards. Thus, the network management device 22 judges that the optical fibre connection relationship is correct, displays the correct optical fibre connection relationship on the interface of the network management device 22 in the graphical or text data table form, and marks the single boards and optical ports corresponding to this optical fibre connection (representing that the OUT1 port of the amplification single board 1 and the IN2 port of the power distribution single board 4 have had optical fibre connection relationship, and the two ports cannot be used again). But for the optical fibre connection between the OUT1 part of the amplification single board 2 and the OUT8 port of the power distribution single board 4, the network management device 22 finds that the single board type is matched, but the port type is mismatched, and the optical fibre connection relationship does not exist in the optical fibre connection relationship data table of actually-installed boards. Thereby, the network management device 22 can give a special display (for example, the displayed line colour is red) when displaying on the interface of the network management device 22. Then the network management device 22 implements the suggestive optical fibre connection matching according to the principle of "upstream single board first, downstream single board second"; starting from the amplification single board 2, and searching for a matchable single board and available optical port according to the principle of single board type matching, optical port type matching, information rate matching, and minimum distance standard (under the condition of equal distance, judgement is made according to the principle described in the database of the network management device 22) etc. The network management device 22 finds that the nearest matchable single board is the power distribution single board 4, and the single board has the ports—IN1 port, IN3 port and IN4 port, which are matched with the OUT1 port of the amplification single board 2. Multiple matchable ports with the same type are matched according to the ascending sequence of the port sequential number. Therefore, the network management device 22 can match the OUT1 port of the amplification single board 2 with the IN1 port of the power distribution single board 4, and gives a suggestive optical fibre connection relationship, that is, makes the OUT1 port of the amplification single board 2 be connected with the IN1 port of the power distribution single board 1. However, the network management device 22 will not mark the single board and the optical port corresponding to the suggestive optical fibre connection relationship in the optical fibre connection relationship data table of actually-installed boards. For the wavelength selection single board 6, the OUT1 port of the single board has no optical fibre connection relationship in the reported connection information packet. The network management device 22 can automatically search for an optimal optical fibre connection matching optical fibre in the optical fibre connection data information table of actually-installed boards, according to the principle of single board type matching, optical port type matching, information rate matching, and minimum distance standard (under the condition of equal distance, judgement is made according to the principle described in the database of the network management device 22) etc. Finally, the network management device 22 finds that the IN1 port of the amplification single board 3 is optimal. Therefore, the network management device 22 can make the OUT1 port of the wavelength selection single board 6 be connected with the IN1 port of the amplification single board 3, and displays it on the interface of the network management device 22 in the special graphical or text data table form (for example, the colour for optical fibre connection is blue, etc.).

This preferred embodiment automatically finds all the actual optical fibre connection relationships, and implements corresponding analysis, judgement and processing for all the conditions of the correct optical fibre connection relationship, the wrong optical fibre connection relationship and the condition that only one end of the single board has the optical fibre connection relationship. This solution displays the actual single board optical fibre connection information, real-timely and synchronously updates the latest optical fibre connection relationship. In this case, the network management device 22 gives information prompt (for example, displaying the automatically-located wrong fibre connection in red colour) for the optical fibre connection relationship which is actually connected wrongly, and gives a suggestive optical fibre connection relationship (for example, displaying in blue) under the condition that other available single boards or ports exist. For the single board only having the connection relationship on one end (for example, the upstream end or downstream end, namely, the input port and the output port connection relationships), the network management device 22 also gives a suggestive connection relationship under the condition that the single board and other single boards have available ports. Based on the above, this embodiment can prompt some optical fibre connection conditions which are hard to be monitored manually (for example, the optical fibre is broken, etc.), easily detects and corrects the optical fibre connection of the system, improves the level of intelligence of the system, and reduces the human resources and the cost for using and maintaining the system.

In conclusion, the embodiments of the disclosure overcome the defect that the optical fibre connection relationship inside the optical network cannot be automatically acquired in the related art. The embodiments of the disclosure provide a solution for detecting the optical fibre connection. That is, after the actual physical optical fibres of the nodes are connected, the network management device 22 can automatically acquire the connection information, can detect the conditions that there is wrong connection or broken actual optical fibres and that only one end of the single board has actual connection relationship, and can give a suggestive connection relationship for the above conditions when the single board has other available port connection. Thereby, the embodiments of the disclosure represent an important solution for improving the intelligence of the optical network, and are also an important implement process for the related SPC service of the optical network to evolve to the final SC service.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. The disclosure cannot be limited by any combination of the specific hardware and software.

The above is only the preferred embodiment of the disclosure and is not intended to limit disclosure. For those skilled in the art, the disclosure may have various changes and modifications. And any modifications, equivalent replacements, improvements etc. within the spirit and principle of the disclosure shall fall within the scope of protection of the disclosure.

What is claimed is:

1. A method for detecting optical fibre connection, comprising steps of:
   a single board judging whether received connection information of a downstream single board, received connection information of an upstream single board and connection information of the single board are reported current optical fibre connection relationship information; and if not the reported current optical fibre connection relationship information, reporting the received connection information of the downstream single board, the received connection information of the upstream single board and the connection information of the single board to a network management system;
   the network management system generating optical fibre matching connection relationship information of all single boards which are currently installed according to actual installation condition of the single boards, and determining whether the reported current optical fibre connection relationship information is correct optical fibre connection relationship according to the optical fibre matching connection relationship information; and
   if it is determined that the reported current optical fibre connection relationship information is the correct optical fibre connection relationship, the network management system marking information corresponding to the current optical fibre connection relationship information in the optical fibre matching connection relationship information, and displaying the current optical fibre connection relationship information; otherwise, the network management system prompting that the current optical fibre connection relationship information is wrong optical fibre connection relationship, and displaying an optimal optical fibre connection relationship information.

2. The method according to claim 1, wherein before the single board judging whether the received connection information of the downstream single board, the received connection information of the upstream single board and the connection information of the single board are the reported current optical fibre connection relationship information, the method further comprises:

the single board storing the connection information of the single board, sending the connection information of the single board to the downstream single board regularly, and receiving the connection information of the downstream single board; and the single board sending the connection information of the single board to the upstream single board after receiving the connection information of the upstream single board.

3. The method according to claim 2, wherein determining whether the reported current optical fibre connection relationship information is correct optical fibre connection relationship according to the optical fibre matching connection relationship information comprises:

when connection information of an optical port in the current optical fibre connection relationship information is empty, determining that the optical port has no optical fibre connection or the optical fibre connection of the optical port has been broken.

4. The method according to claim, wherein before the network management system generating the optical fibre matching connection relationship information of all the single boards which are currently installed according to actual installation condition of the single boards, the method further comprises:

the network management system storing matching connection relationship information of all the single boards and the optical ports of the single boards.

5. The method according to claim 4, wherein the network management system displaying the optimal optical fibre connection relationship information comprises:

acquiring and displaying the optimal optical fibre connection relationship information according to a single board type matching principle and/or an optical port type matching principle.

6. The method according to claim 4, wherein the network management system displaying the optimal optical fibre connection relationship information comprises:

acquiring and displaying the optimal optical fibre connection relationship information sequentially according to a single board minimum distance principle and/or an optical port number sequence principle.

7. The method according to claim 4, wherein after the network management system determining whether the reported current optical fibre connection relationship information is correct optical fibre connection relationship according to the optical fibre matching connection relationship information, the method fu her comprises:

the network management system displaying the current optical fibre connection relationship information and the optimal optical fibre connection relationship information on a user interface in a graphical or text data table form.

8. The method according to claim 2, wherein before the network management system generating the optical fibre matching connection relationship information of all the single boards which are currently installed according to actual installation condition of the single boards, the method further comprises:

the network management system storing matching connection relationship information of all the single boards and the optical ports of the single boards.

9. The method according to claim 8, wherein the network management system displaying the optimal optical fibre connection relationship information comprises:

acquiring and displaying the optimal optical fibre connection relationship information according to a single board type matching principle and/or an optical port type matching principle.

10. The method according to claim 8, wherein the network management system displaying the optimal optical fibre connection relationship information comprises:

acquiring and displaying the optimal optical fibre connection relationship information sequentially according to a single board minimum distance principle and/or an optical port number sequence principle.

11. The method according to claim 8, wherein after the network management system determining whether the reported current optical fibre connection relationship information is correct optical fibre connection relationship according to the optical fibre matching connection relationship information, the method further prises:

the network management system displaying the current optical fibre connection relationship information and the optimal optical fibre connection relationship information on a user interface in a graphical or text data table form.

12. The method according to claim 1, wherein before the network management system generating the optical fibre matching connection relationship information of all the single boards which are currently installed according to actual installation condition of the single boards, the method further comprises:

the network management system storing matching connection relationship information of all the single boards and the optical ports of the single boards.

13. The method according to claim 12, wherein the network management system displaying the optimal optical fibre connection relationship information comprises:

acquiring and displaying the optimal optical fibre connection relationship information according to a single board type matching principle and/or an optical port type matching principle.

14. The method according to claim 12, wherein the network management system displaying the optimal optical fibre connection relationship information comprises:

acquiring and displaying the optimal optical fibre connection relationship information sequentially according to a single board minimum distance principle and/or an optical port number sequence principle.

15. The method according to claim 12, wherein after the network management system determining whether the reported current optical fibre connection relationship information is correct optical fibre connection relationship according to the optical fibre matching connection relationship information, the method further comprises:

the network management system displaying the current optical fibre connection relationship information and the optimal optical fibre connection relationship information on a user interface in a graphical or text data table form.

16. A system for detecting optical fibre connection, comprising a single board processing device and a network management device, wherein the single board processing device comprises:

a judgement module, configured to judge whether connection information of a single board, received connection information of a downstream single board and received connection information of an upstream single board are reported current optical fibre connection relationship information; and a reporting module, configured to report the connection information of the single board, the received connection information of the downstream single board and the received connection information of the upstream single board to the network management device under the condition that the judgement module determines that the connection information of the single board, the received connection information of the downstream single board and the received connection information of the upstream single board are not the reported current optical fibre connection relationship information; and the network management device comprises:

a generation module, configured to generate optical fibre matching connection relationship information of all single boards which are currently installed according to actual installation condition of the single boards;

a determination module, configured to determine whether the reported current optical fibre connection relationship information is correct optical fibre connection relationship according to the optical fibre matching connection relationship information; and a processing module, configured to mark information corresponding to the current optical fibre connection relationship information in the optical fibre matching connection relationship information under the condition that the determination module determines that the reported current optical fibre connection relationship information is the correct optical fibre connection relationship; and to prompt that the current optical fibre connection relationship information is wrong optical fibre connection relationship and to display an optimal optical fibre connection relationship information under the condition that the determination module determines that the reported current optical fibre connection relationship information is the wrong optical fibre connection relationship.

17. The system according to claim 16, wherein the single board processing device further comprises:

a single board information module, configured to store the connection information of the single board, and send the connection information of the single board to a single board output port monitoring module, a single board input port monitoring module and the judgement module;

the single board output port monitoring module, configured to send the connection information of the single board to the downstream single board regularly, and send the connection information of the downstream single board to the judgement module regularly after receiving the connection information of the downstream single board; and the single board input port monitoring module, configured to send the connection information of the single board to the upstream single board after receiving the connection information of the upstream single board, and to send the received connection information of the upstream single board to the judgement module regularly.

18. The system according to claim 17, wherein the determination module is further configured to, when connection information of an optical port in the current optical fibre connection relationship information is empty, determine that the optical port has no optical fibre connection or the optical fibre connection of the optical port has been broken.

19. The system according to claim 16, wherein the determination module is further configured to, when connection information of an optical port in the current optical fibre connection relationship information is empty, determine that the optical port has no optical fibre connection or the optical fibre connection of the optical port has been broken.

* * * * *